United States Patent [19]
Minoura et al.

[11] Patent Number: 5,631,750
[45] Date of Patent: May 20, 1997

[54] SCATTERING TYPE LIQUID CRYSTAL DEVICE

[75] Inventors: Nobuo Minoura, Yokohama; Hidetoshi Suzuki, Atsugi; Katsumi Kurematsu, Kawasaki; Kazuo Yoshinaga, Machida; Hideaki Mitsutake, Tokyo, all of Japan

[73] Assignee: Canon Kabushiki Kaisha, Tokyo, Japan

[21] Appl. No.: 212,284

[22] Filed: Mar. 14, 1994

Related U.S. Application Data

[63] Continuation of Ser. No. 798,517, Nov. 26, 1991, abandoned.

[30] Foreign Application Priority Data

| Nov. 28, 1990 | [JP] | Japan | 2-322457 |
| Nov. 28, 1990 | [JP] | Japan | 2-322458 |
| Dec. 27, 1990 | [JP] | Japan | 2-415012 |

[51] Int. Cl.$^6$ .................. G02F 1/1333; G02F 1/1335
[52] U.S. Cl. ............................. 349/110; 349/5
[58] Field of Search .................. 359/40, 41, 67

[56] References Cited

U.S. PATENT DOCUMENTS

| 4,613,207 | 9/1986 | Fergason | 359/41 |
| 4,729,640 | 3/1988 | Sakata | 359/42 |
| 4,729,641 | 3/1988 | Matsuoka et al. | 359/40 |
| 4,732,456 | 3/1988 | Fergason et al. | 359/51 |
| 4,795,243 | 1/1989 | Suzuki | 359/296 |
| 4,822,146 | 4/1989 | Yamanobe et al. | 359/94 |
| 4,836,652 | 6/1989 | Oishi et al. | 359/63 |
| 4,848,879 | 7/1989 | Nishimura et al. | 359/289 |
| 4,850,681 | 7/1989 | Yamanobe et al. | 359/84 |
| 4,856,869 | 8/1989 | Sakata et al. | 359/94 |
| 4,865,426 | 9/1989 | Matsuoka et al. | 359/289 |
| 4,872,743 | 10/1989 | Baba et al. | 359/289 |
| 4,945,348 | 7/1990 | Ibamoto et al. | 359/40 |
| 4,989,076 | 1/1991 | Owada et al. | 359/40 X |
| 5,013,141 | 5/1991 | Sakata | 359/62 |
| 5,103,327 | 4/1992 | Hirai et al. | 359/102 |
| 5,151,801 | 9/1992 | Hiroshima | 359/40 |
| 5,353,133 | 10/1994 | Bernkopf | 359/41 |

FOREIGN PATENT DOCUMENTS

| 5099751 | 8/1975 | Japan . |
| 6248789 | 3/1987 | Japan . |
| 6398631 | 4/1988 | Japan . |
| 63-098631 | 4/1988 | Japan . |
| 63-185188 | 7/1988 | Japan . |
| 1222221 | 9/1989 | Japan | 359/40 |
| 2016065 | 1/1990 | Japan . |
| 2251820 | 10/1990 | Japan . |
| 3214121 | 9/1991 | Japan | 359/40 |
| 2155679 | 9/1985 | United Kingdom . |

OTHER PUBLICATIONS

Caulfield, H.J et al "Optical Contrast Enhancement in Liquid Crystal Devices by Spatial Filtering," Applied Physics Letters, vol. 18, No. 1, Jan. 1971, pp. 5–6.

Patent Abstracts of Japan, vol. 10, No. 143, 60–262131, Dec. 1985.

*Primary Examiner*—William L. Sikes
*Assistant Examiner*—Charles Miller
*Attorney, Agent, or Firm*—Morgan & Finnegan LLP

[57] ABSTRACT

A liquid crystal device for controlling scattering of light beams incident upon a liquid crystal layer so as to modulate the light beams includes: a first lens array having lenses corresponding to the liquid crystal layer, the lenses causing the light beams transmitted from the liquid crystal layer, the lenses causing the light beams transmitted from the liquid crystal layer to travel toward a focal plane; a mask for shielding scattered light transmitted from the first lens array as well as allowing non-scattered light to pass through, the mask having a plurality of aperture portions which are formed along the focal plane to correspond to the lenses of the first lens array so as to allow non-scattered light transmitted from corresponding lenses to pass through; and a second lens array having lenses arranged to correspond to the aperture portions of the mask, the lenses substantially collimating the non-scattered light transmitted from corresponding aperture portions of the mask.

15 Claims, 12 Drawing Sheets

SCATTERING TYPE LIQUID CRYSTAL DEVICE

This is a continuation of application Ser. No. 07/798,517, filed on Nov. 26, 1991, now abandoned.

BACKGROUND OF THE INVENTION

1. Field of the Invention

The present invention relates to a scattering type liquid crystal device.

A scattering type liquid crystal device has a liquid crystal layer which uses dynamic scattering mode liquid crystal (DSMLC), polymer droplet liquid crystal (PDLC) or polymer network liquid crystal (PNLC) to control scattering of light.

2. Related Background Art

A direct viewing type display apparatus using a device of the abovedescribed type has been disclosed in Japanese Patent Publication No. 63-98631 and projection type display apparatuses each using a device of the abovedescribed type have been respectively disclosed in Japanese Patent Laid Open No. 50-99751 and U.S. Pat. No. 4,613,207.

The projection type display apparatus of this type has been arranged in such a manner that its projection optical system has a mask having apertures in order to shield scattered light from the liquid crystal device and to direct non-scattering light to the screen. However, there arises a problem in that a large quantity, which cannot be neglected, of scattered light passes through the apertures formed in the mask and it is made incident upon the screen, causing the quality of the image formed on the screen to be deteriorated.

SUMMARY OF THE INVENTION

Accordingly, an object of the present invention is to provide an improved scattering type liquid crystal device.

According to one aspect of the present invention, there is provided a liquid crystal device for controlling scattering of light beams made incident upon a plurality of portions of pixels of a liquid crystal layer thereof so as to modulate the light beams, the liquid crystal device comprising: a first lens array having lenses disposed to correspond to the portions of the liquid crystal layer, the lenses causing the light beams transmitted from the corresponding portions of the liquid crystal layer to travel toward a focal plane; a mask for shielding scattered light transmitted from the first lens array and as well as allowing non-scattered light to pass through, the mask having a plurality of aperture portions which are formed along the focal plane to correspond to the lenses of the first lens array so as to allow non-scattered light transmitted from corresponding lenses to pass through; and a second lens array having lenses arranged to correspond to the aperture portions of the mask, the lenses substantially collimating the non-scattered light transmitted from corresponding aperture portions of the mask.

According to another aspect of the present invention, there is provided a liquid crystal device for controlling scattering of light beams made incident upon a plurality of portions of pixels of a liquid crystal layer thereof so as to modulate the light beams, the liquid crystal device comprising: a lens array having lenses disposed to correspond to the portions of the liquid crystal layer, the lenses converging the light beams to the corresponding portions of the liquid crystal layer; a mask for shielding scattered light transmitted from the liquid crystal layer and as well as allowing non-scattered light to pass through, the mask having a plurality of aperture portions formed to correspond to the portions of the liquid crystal layer so as to allow the non-scattered light transmitted from the corresponding portions to pass through.

Since the liquid crystal device according to the present invention is capable of shielding scattered light by a mask thereof at a position adjacent to the liquid crystal layer, scattered light travelling from the device toward the screen can be significantly reduced and thereby the quality of a formed image can be improved when it is applied to a projection type display apparatus.

Other and further objects, features and advantages of the invention will be appear more fully from the following description.

BRIEF DESCRIPTION OF THE DRAWINGS

FIG. 8A is a graph which illustrates the reflection characteristics of a red reflecting film;

FIG. 8B is a graph which illustrates the reflection characteristics of a blue reflecting film;

DETAILED DESCRIPTION OF THE PREFERRED EMBODIMENTS

Figure 1:
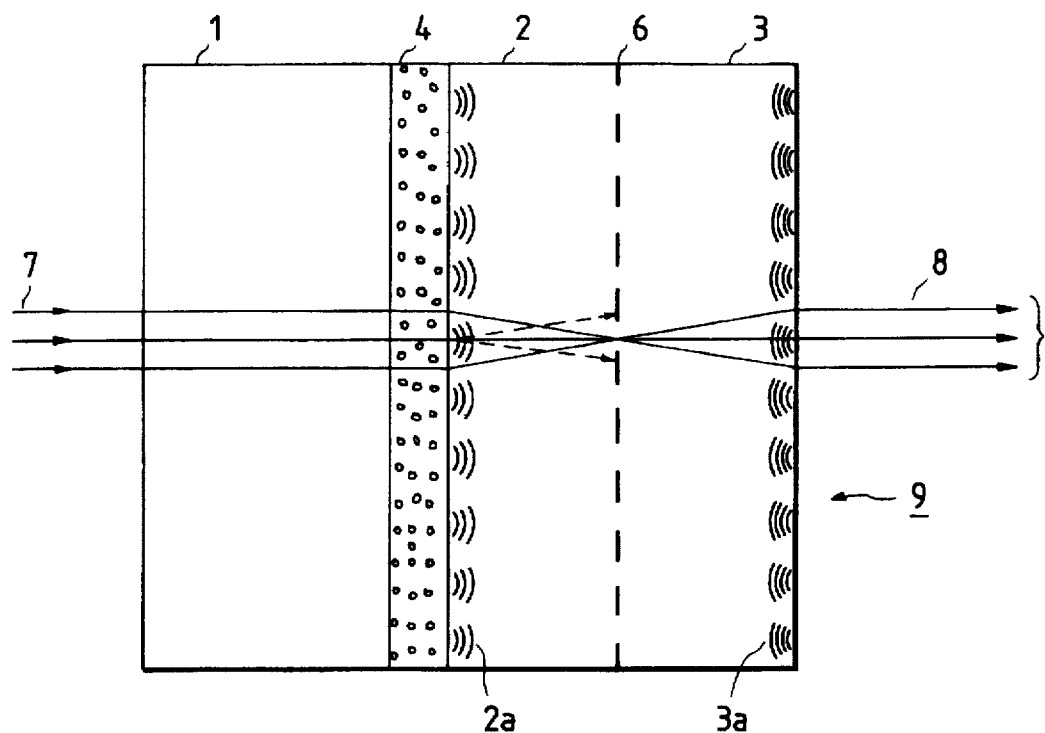
FIG. 1 is a cross sectional view which illustrates an essential portion of the structure of an embodiment of a liquid crystal display device according to the present invention.
Figure 2:
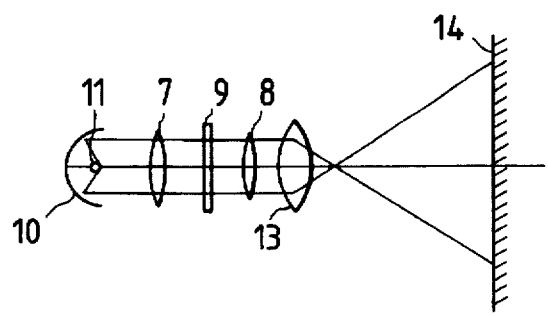
FIG. 2 illustrates an optical principle when an enlarged projected image is formed by using the liquid crystal display device shown in FIG. 1.
Figure 3:
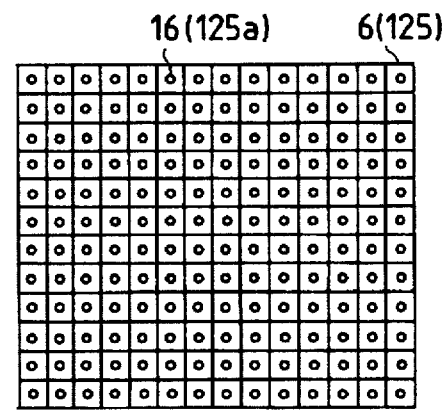
FIG. 3 is a plan view which illustrates the structure of the aperture mask shown in FIG. 1.

FIG. 1 is a cross sectional view which illustrates an essential portion of an embodiment of the liquid crystal display device according to the present invention. FIG. 2 illustrates an optical principle of a function of forming an enlarged projected image by using the liquid crystal display device shown in FIG. 1. FIG. 3 is a plan view which illustrates the structure of an aperture mask 6 shown in FIG. 1.

The liquid crystal display device shown in FIG. 1 comprises an active matrix scattering type liquid crystal plate 4, three glass plates 1 to 3 and an aperture mask 6.

The scattering type liquid crystal plate 4 is disposed between the first transparent glass plate 1 and the second transparent glass plate 2, while the aperture mask 6 is disposed between the second glass plate 2 and the third transparent glass plate 3 so that an emission panel is constituted. The liquid crystal display device according to this embodiment is arranged in such a manner that the first glass plate 1 is made to be the light incidental side and the third glass plate 3 is made to be the light emission side. Furthermore, the portion of the second glass plate 2 adjacent to the scattering type liquid crystal plate 4 (light incidental side) and the portion of the third glass plate 3 adjacent to the light emission side are provided with first and second lens arrays 2a and 3a each of which is composed of a configuration of a plurality of lenses of a reflectance distributed type which corresponds to each pixel of the scattering type liquid crystal plate 4 in such a manner that the aperture mask 6 is made to be positioned at their focal points. Furthermore, the aperture mask 6 has a plurality of apertures, each of which, similarly to the first and the second lens arrays 2a and 3a, corresponds to each pixel of the scattering type liquid crystal plate 4 in such a manner that they form an array similarly to the first and the second lens arrays 2a and 3a. As a result, it constitutes a schlieren optical system in cooperation with the first lens array 2a. The thickness of each of the first and the third glass plates 1 and 3 are made to be the same as the focal distance of each of the lens arrays 2a and 3a. Therefore, incidental light beam 7, which has passed through the transmission mode pixels of the scattering type liquid crystal plate 4 is, as designated by a continuous line shown in FIG. 1, caused to travel while being focused at the aperture portion of the aperture mask 6 by the corresponding lens of the first lens array 2a. Then, it is made to be an emitted light beam 8, which is a parallel beam, by the corresponding lens of the second lens array 3a before it is emitted outwards.

In a case where it has passed through the scattering mode pixels of the scattering type liquid crystal plate 4, the incidental light beam 7 is diffused as designated by a dashed line of FIG. 1 and thereby the major portion of it is shielded by the aperture mask 6. Therefore, the outward leakage of light is prevented.

A liquid crystal display device 9 shown in FIG. 2 is structured as shown in FIG. 1. A light beam generated by a light source 11 is made to be a parallel light beam 7 (incidental light beam) by a parabolic mirror 10 before it passes through the liquid crystal display device 9 which is a light bulb. As a result, it is made to be the emitted light beam 8 which is a parallel image light beam, causing the light incidental side to be projected to a screen 14 by a projection lens 13 of telecentric system which is formed on the light incidental side while being enlarged.

The aperture mask 6 has aperture mask apertures (apertures) 16 which correspond to the pixels of the scattering type liquid crystal plate 4, the aperture mask apertures being disposed to form a lattice as shown in FIG. 3. The material and the color of the aperture mask 6 are not limited particularly. However, it is preferable that black be employed because it exhibits excellent light absorption. The optimum aperture area of the aperture mask apertures 16 and the thickness of each of the glass plates 2 and 3 are determined in accordance with the power (the focal distance) of each of the lens arrays 2a and 3a, the parallelism of the incidental light beam 7, the scattering characteristics of the scattering type liquid crystal plate 4 and the size of each pixel.

As described above, the liquid crystal device 9 according to this embodiment is arranged in such a manner that the schlieren optical system is formed for each pixel. Therefore, a projection type display apparatus constituted by using the abovedescribed device 9 exhibits excellent performance of removing scattered light in comparison to a conventional device in which a single schlieren optical system is formed for one frame. Therefore, generations of flare and ghost can be prevented satisfactorily.

Also in a case where the abovedescribed structure is constituted, the introduction of the portion of the leakage into the adjacent image cannot exceed a level which causes the contrast to be lowered or causes the flare to be generated. Assuming that the parallelism of light emitted from an ordinary light source is ±5 degrees and as well as the schlieren optical system comprising lens array 2a and an aperature mask 76 is designed to be formed into an optimum structure, the contrast of the liquid crystal display device according to this embodiment is 100:1 or more and the worst value of the adjoining interference is 1/200 or less.

Figure 4:
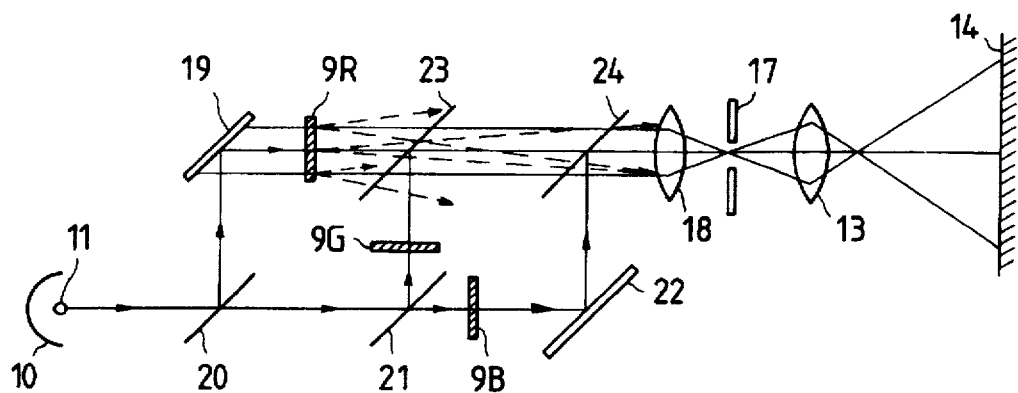
FIGS. 4 to 6 respectively illustrate the structures of first to third embodiments of a projection type display apparatus by using the liquid crystal display device shown in FIGS. 1 and 2.

FIG. 4 is a structural view which illustrates a projection type display apparatus constituted by using the liquid crystal display device shown in FIG. 2.

According to this embodiment, a red image light beam of the light beams generated in the light source 11 illuminates the liquid crystal display device 9R via a red reflecting dichroic mirror 20 and a reflecting mirror 19. A green image light beam and a blue image light beam respectively illuminate liquid crystal display devices 9G and 9B via a red reflecting dichroic mirror 20 and a green reflecting dichroic mirror 21.

Each of color image light beams obtained by illuminating the liquid crystal display devices 9R, 9G and 9B are synthesized by a reflecting mirror 22, a green reflecting and red permeable dichroic mirror 23 and a blue reflecting dichroic mirror 24 before the synthesized light beam is made incident upon a lens 18. The above-described lens 18 constitutes the schlieren optical system in cooperation with an aperture stop 17. Thus, the synthesized illuminating light beam from which scattered light has been further removed is projected on the surface of the screen 14 in an enlarged manner by a projection lens 13 disposed next to the aperture stop 17. According to this embodiment, the projection optical system (13, 17 and 18) is formed into a system the light incidental side of which is formed into a telecentric structure.

According to this embodiment, the liquid crystal devices 9R, 9G and 9B each including the micro-schlieren optical system and the schlieren optical system composed of the lens 18 and the aperture stop 17 are combined to each other. Therefore, generation of scattered light is further prevented and as well as the interference (adjoining interference) in the liquid crystal display device can be prevented. As a result, the employed optical devices can be further freely disposed or the dimensions can be determined also freely, causing an effect to be obtained in that the overall size of the apparatus can be reduced.

Figure 5:
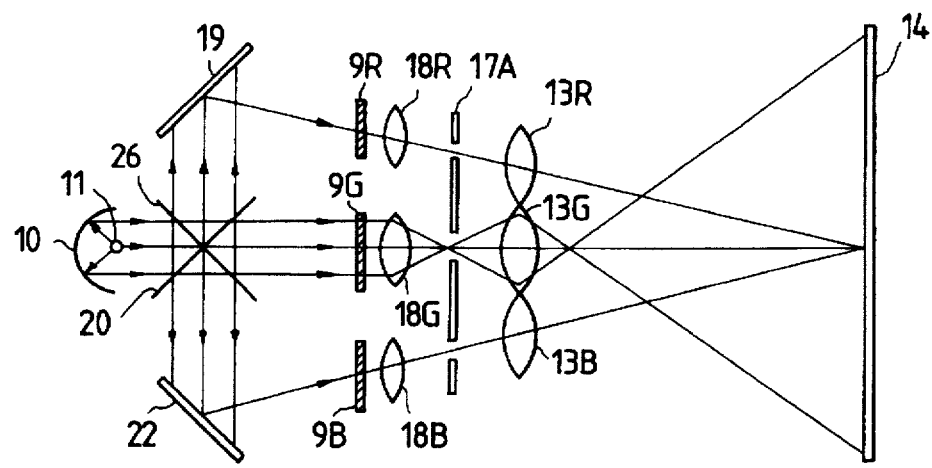

FIG. 5 illustrates the structure of a second embodiment of the projection type display apparatus which employs the liquid crystal display device shown in FIGS. 1 and 2.

According to this embodiment, a projection type display apparatus is formed into a 3-lens 3-liquid crystal apparatus.

A light beam generated in the light source 11 is made to be a parallel beam by the parabolic mirror 10 disposed in the rear of the light source 11. The parallel beam thus-formed is made incident upon the red reflecting dichroic mirror 20 and a blue reflecting dichroic mirror 26 disposed to intersect each other so that it is decomposed into red, blue and green light beams. Each of the red light beam and the blue light beam is returned by the reflecting mirrors 19 and 22 so as to respectively illuminate the liquid crystal display devices 9R and 9B. On the other hand, the green light beam passes through each of the abovedescribed dichroic mirrors 20 and 26 so as to illuminate the liquid crystal device 9G.

The color image light beams obtained from each of the liquid crystal display devices 9R, 9G and 9B are respectively made incident upon the lenses 18R, 18G and 18B. The abovedescribed lenses 18R, 18G and 18B constitute a schlieren optical system in cooperation with an aperture stop 17A. As a result, scattered light is removed from each of the image light beams which is, in an enlarged view, then projected on the surface of the transmission type screen 14 by projection lenses 13R, 13G and 13B.

Figure 6:
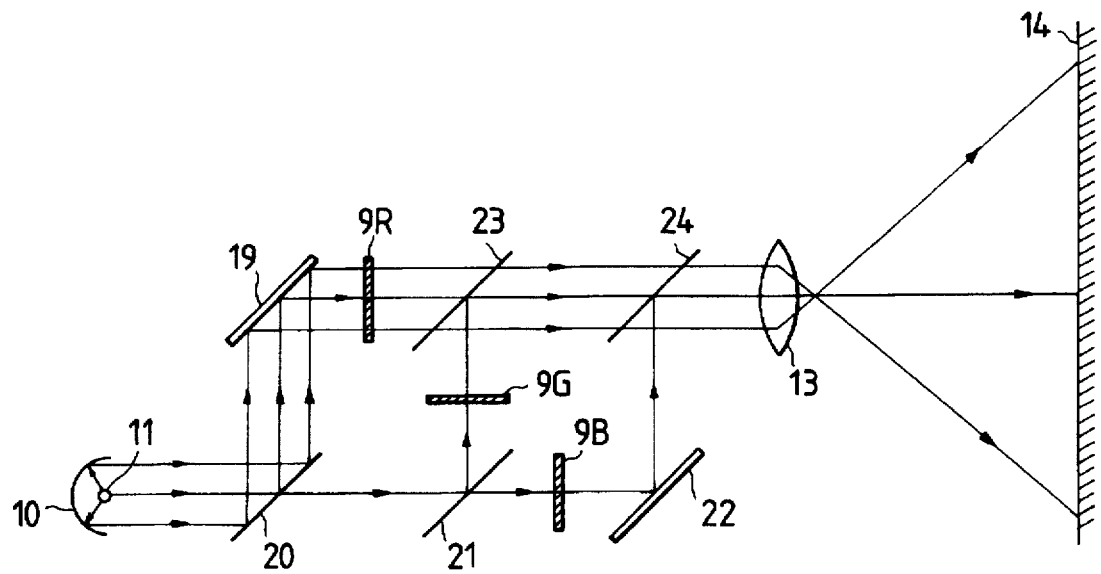

FIG. 6 illustrates the structure of a third embodiment of the projection type display apparatus constituted by using the liquid crystal display device according to the present invention.

According to this embodiment, the liquid crystal display device including the micro-schlieren optical system shown in FIG. 1 is applied to an ordinary optical system which uses a TN type liquid crystal device.

Since the structure of the optical system according to this embodiment is arranged similarly to the embodiment shown in FIG. 4 except for the omission of the lens 18 and the aperture stop 17, the same reference numerals are given to the same elements and therefore their descriptions are omitted here.

Since the liquid crystal display devices 9R, 9G and 9B are individually able to prevent generation of scattered light, the contrast obtainable from the TN type liquid crystal display device can be obtained. Furthermore, since no polarizing plate is used, an advantage can be obtained in that brightness can be doubled even if the same light source is used.

Although the liquid crystal display device is arranged to be the active matrix type display device according to the abovedescribed embodiments, a simple matrix type display device may be employed. Furthermore, the structure arranged in such a manner that the refraction factor distributed type lens disposed in the liquid crystal display device is positioned to correspond to each pixel may be replaced by a structure in which the same is positioned to correspond to a plurality of pixels.

Since the liquid crystal display device is arranged in such a manner that the schlieren effect can be generated in each pixel, generation of scattered light in the liquid crystal display device can be reduced. Furthermore, the aperture mask is disposed to confront each pixel so that undesirable light incidence from other liquid crystal display devices and undesirable introduction of leaked light to the adjacent pixels can be reduced or prevented.

Since the abovedescribed light shielding function is given to the device level, an image from which flare or ghost has been removed and which thereby exhibits excellent contrast can be obtained in a case where the projection type display apparatus is constituted by using the liquid crystal display device according to the present invention. Furthermore, since the light shielding mechanism can be reduced from the overall structure of the apparatus, the overall size of the apparatus can be reduced.

Furthermore, it can be used in place of the TN type liquid crystal. In this case, since the polarizing plate for use with the TN type liquid crystal is not used, the brightness can be doubled and therefore the light source can efficiently be used.

Figure 7:
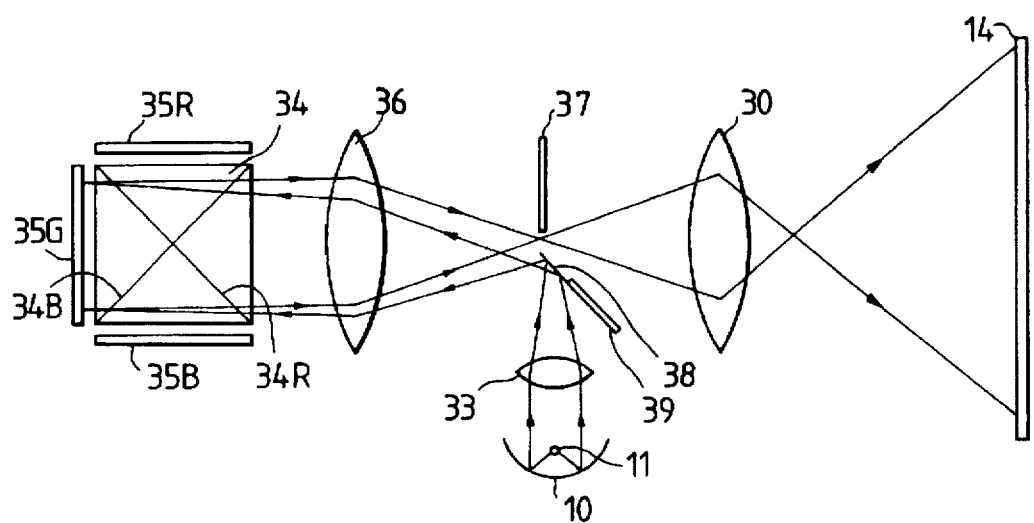
FIG. 7 is a schematic structural view which illustrates a fourth embodiment of the projection type liquid crystal display apparatus according to the present invention.

FIG. 7 is a schematic structural view which illustrates a fourth embodiment of the projection type liquid crystal display apparatus according to the present invention.

The projection type liquid crystal display apparatus according to this embodiment comprises a light source portion having a light source 11, a parabolic mirror 12 and a lens 33. Furthermore, the liquid crystal display apparatus comprises a dichroic prism 34 in which a red reflecting dichroic film 34R and a blue reflecting dichroic film 34B are intersected to each other. The liquid crystal display apparatus further comprises a red reflecting and scattering type liquid crystal device 35R, a green reflecting and scattering type liquid crystal device 35G and a blue reflecting and scattering type liquid crystal device 35B which are respectively disposed on the three sides of the dichroic prism 34. In addition, the liquid crystal display apparatus further comprises a convergent lens 36 disposed between the dichroic prism 34 and the screen 14. Furthermore, the liquid crystal display apparatus further comprises a first shielding mask 37 disposed adjacent to the convergent point (focal point) of the convergent lens 36 on either side of the convergent point (according to this embodiment, on the illustrated side) to run parallel to the screen 14. In addition, the liquid crystal display apparatus further comprises a reflecting mirror 38 an end portion of which is placed to confront an end portion of the above-described convergent point of the first mask 37 while making a predetermined angle from the same, the reflecting mirror 38 being arranged to reflect light emitted from the abovedescribed light source portion to make it incident upon the convergent lens 36. Furthermore, the liquid crystal display apparatus further comprises a second shielding mask 39 disposed on the same plane as the mirror surface of the reflecting mirror 38, an end portion of the shielding mask 39 being positioned in contact with another end portion of the reflecting mirror 38.

The red reflecting and scattering type liquid crystal device 35R is disposed on the side surface of the dichroic prism 34 which confronts the reflecting surface of the red reflecting film 34R. The blue reflecting and scattering type liquid crystal device 35B is disposed on the side surface of the dichroic prism 34 which confronts the reflecting surface of the blue reflecting film 34B. The green reflecting and scattering type liquid crystal device 35G is disposed on the side surface which confronts the incident and emission side of the dichroic prism 34.

Figure 8A:
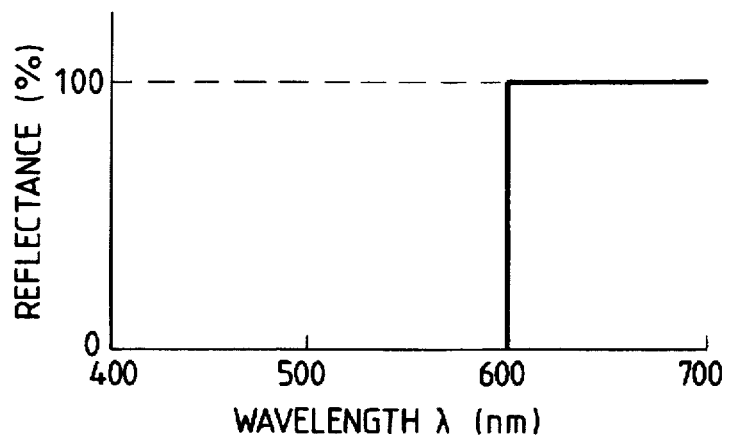
FIGS. 8A and 8B are graphs which illustrate reflection characteristics of a reflecting film of a dichroic prism, where
Figure 8B:
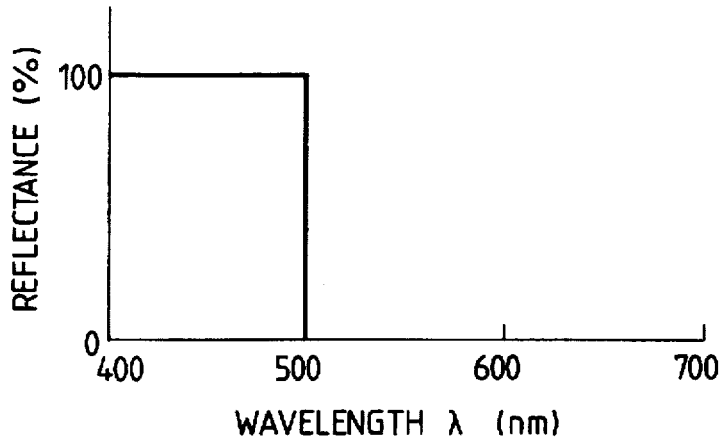

As shown in FIG. 8A, the red reflecting film 34R of the dichroic prism 34 has reflecting characteristics with which only light (red light beam), the wavelength λ of which is 600 nm or more, is reflected. As shown in FIG. 8B, the blue reflecting film 34B of the dichroic prism 34 has reflecting characteristics with which only light (blue light beam), the wavelength λ of which is 500 nm or less, is refelected. Therefore, the abovedescribed red reflecting and scattering type liquid crystal device 35R receives only the red light beam of white light beam emitted from the above-described light source portion, while the blue reflecting and scattering type liquid crystal device 35B receives only the blue light beam of the above-described white light beam. Furthermore, the green reflecting and scattering type liquid crystal device 35G received only the green light beam of the above-described white light beam.

Figure 9:
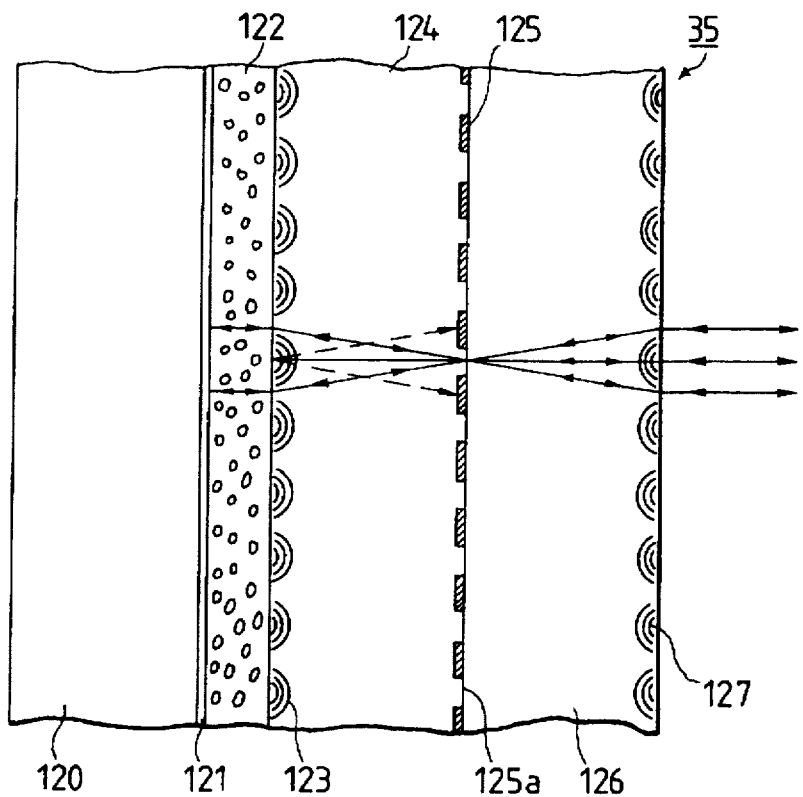
FIG. 9 is a partial side elevational cross sectional view which illustrates the structure of a reflecting and scattering type liquid crystal device.

FIG. 9 is a partial side elevational cross sectional view which illustrates the structure of the reflecting and scattering type liquid crystal devices 35R, 35G and 35B.

Each of the reflecting and scattering type liquid crystal devices 35R, 35G and 35B is structured in which a first glass layer 120, a reflecting mirror layer 121, a scattering type liquid crystal plate 122, a second glass layer 124 and a third glass layer 126 are sequentially stacked in this order, the reflecting and scattering type liquid crystal device being a modification made in such a manner that the device shown in FIG. 1 is made to be a reflecting type device.

The liquid crystal of the scattering type liquid crystal 122 is polymer droplet liquid crystal (PPLC) or polymer network liquid crystal (PNLC). The liquid crystal of this type can be applied to the device shown in FIG. 1. The surface of the second glass 124, which is allowed to adhere to the scattering type liquid crystal layer 122, has the first refraction factor distributed type lens array 123 formed to correspond to each pixel. The incidental surface of the third glass layer 126 has the second refraction factor distributed type lens array 127 formed to confront the first refraction factor distributed type lens 23. Furthermore, the surface of adhesion to be made between the second glass layer 124 and the third glass layer 126 has an aperture mask 125 for absorbing light. The aperture mask 125 has apertures 125 formed in such a manner that each of the apertures 125 confronts the center of the lens of each of the abovedescribed two refraction factor distributed type lens arrays 123 and 127. That is, when the reflecting and scattering type liquid crystal device 35 is viewed from the incidental surface of the third glass layer 126, the aperture 25a of the aperture mask 125 is positioned at the central position of each pixel as shown in FIG. 3.

Therefore, as designated by a continuous line of FIG. 9, the parallel light beam made incident upon the light incidental surface of the third glass layer 126 and to be applied to one pixel of the scattering type liquid crystal plate 122 is converged by the lens of the second refraction factor distributed type lens array 127. Then, the light beam passes through the aperture 125a of the aperture mask 125 before it is again made to be a parallel beam by the lens of the first refraction factor distributed type lens array 123 so as to be made incident upon the scattering type liquid crystal plate 122.

The aperture mask 125 acts in such a manner that it causes the modulated parallel beam to be emitted from the device when the scattering type liquid crystal plate 122 is in a transmission mode and it inhibits the light emission from the device when the scattering type liquid crystal plate 22 is in a scattering mode. The aperture mask 125 constitutes the schlieren optical system in cooperation with the above-described two refraction factor distributed type lens arrays 123 and 127.

That is, when the scattering type liquid crystal plate 122 is in the transmission mode, the parallel beam made incident upon the scattering type liquid crystal plate 122 is reflected by the reflecting mirror 121. Then, it is, as the parallel beam, emitted from the scattering type liquid crystal plate 122 before it is converged at the focal point by the lens of the first refraction factor distributed type lens array 123. Then, the converged light beam passes through the aperture 125a of the aperture mask 125 before it is returned to a parallel beam by the lens of the second refraction factor distributed type lens array 127. Then, the parallel beam is emitted from the incidental surface of the third glass layer 126. In a case where the scattering type liquid crystal plate 122 is in the scattering mode, the above-described parallel beam reflected by the reflecting mirror 121 is made to be scattered light because it is not converged as designated by a dashed line of FIG. 9 even if it passes through the lens of the first refraction factor distributed type lens array 123 but it is scattered. Therefore, scattered light is substantially absorbed by the aperture mask 25 and thereby it is stopped.

Then, the operation of the abovedescribed projection type liquid crystal display apparatus will now be described with reference to FIG. 7.

The white light beam emitted from the light source portion composed of the light source 11, the parabolic mirror 12 and the lens 33 is made incident upon the reflecting mirror 38 so that it is reflected to the convergent lens 36. The reflected while light beam is substantially converted into a parallel beam by the convergent lens 36 before it is made incident upon the cross dichroic prism 34.

A red light beam of the abovedescribed white light beam made incident upon the cross dichroic prism 34 is reflected by the red reflecting film 34R before it is made incident upon the red reflecting and scattering type liquid crystal device 35R in which it is then modulated in accordance with the red color component of the image. A blue light beam is reflected by the blue reflecting film 34B before it is made incident upon the blue reflecting and scattering type liquid crystal device 35B in which it is modulated in accordance with the blue color component of the image. A green light beam passes through the red reflecting film 34R and the blue reflecting film 34B before it is made incident upon the green reflecting and scattering type liquid crystal device 35G in which it is modulated in accordance with the green component of the image.

The red image light beam, the blue image light beam and the green image light beam modulated by the above-described three reflecting and scattering type liquid crystal devices 35R, 35B and 35G are emitted from the devices since they are reflected by the reflecting mirror layer 121 (see FIG. 9). As a result, the red image light beam is reflected by the red reflecting film 34R toward the screen 14. The modulated blue light beam is reflected by the blue reflecting film 34B toward the screen 14. The modulated green light beam passes through the red reflecting film 34R and the blue reflecting film 34B. As a result, the color light beams are respectively synthesized before it is emitted from the cross dichroic prism 34 as a substantially parallel light beam.

The above-described parallel light beam is converged at a portion adjacent to the aperture portion formed by an end portion of the first shielding mask 37 and an end portion of the reflecting mirror 38 by the convergent lens 36. The light beam, which has passed through the abovedescribed aperture portion, is projected to the screen 14 via a projection lens 30. As a result, the abovedescribed image is projected onto the screen 14 in an enlarged manner. According to this embodiment, the optical system composed of the lenses 30, 36, members 37, 38 and 39 is arranged in such a manner that the light incidental side is a telecentric structure.

In this case, the abovedescribed three reflecting and scattering type liquid crystal devices 35R, 35B and 35G are brought into the scattering mode depending upon the abovedescribed image, causing slight quantity of scattered light, which is unnecessary light, to be emitted from the cross dichroic prism 34. However, a portion of scattered light is absorbed and thereby shielded by the first shielding mask 37 and the second shielding mask 39 or the same is reflected by the reflecting mirror 38 to be returned to the abovedescribed light source portion. Therefore, it cannot substantially be projected onto the screen 14. As a result, in the projection type liquid crystal display device according to this embodiment, the devices 35R, 35G and 35B serve as the masks so that generation of the flare or the ghost in the image projected onto the screen 14 in an enlarged manner due to the abovedescribed scattered light can be reduced.

Furthermore, since the schlieren optical system is composed of the convergent lens 36, the first shielding mask 37 and the reflecting mirror 38, the contrast of the image projected onto screen 14 in an enlarged manner can be raised.

Figure 10:
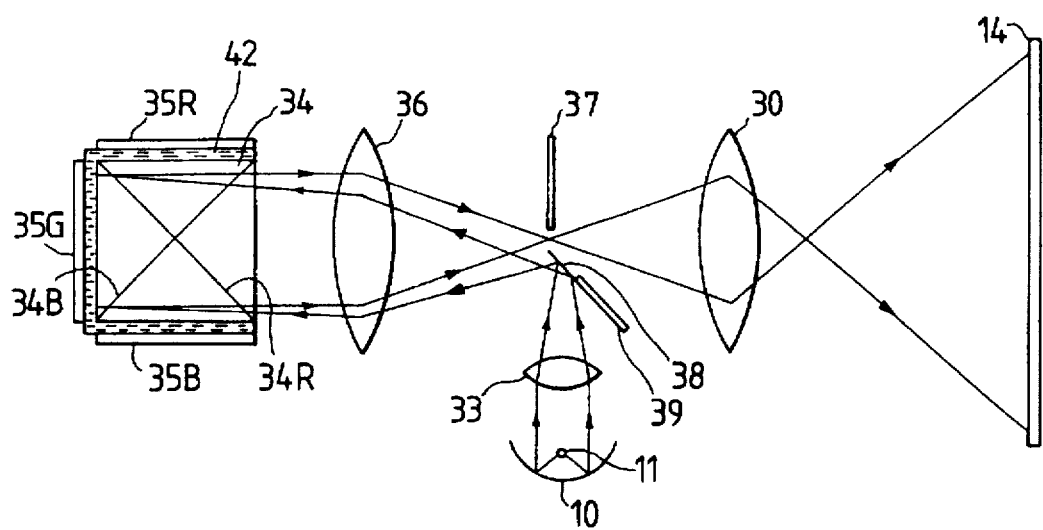
FIG. 10 is a schematic structural view which illustrates a fifth embodiment of the projection type liquid crystal display apparatus according to the present invention.

FIG. 10 is a schematic structural view which illustrates a fifth embodiment of the projection type liquid crystal display apparatus according to the present invention.

The projection type liquid crystal display apparatus according to this embodiment is different from the projection type liquid crystal display apparatus shown in FIG. 7 in that aqueous solution of ethylene glycol 42 is enclosed between the three reflecting and scattering type liquid crystal devices 35R, 35B and 35G and the cross dichroic prism 34 so that each of the three reflecting and scattering type liquid crystal devices 35R, 35B and 35G and the cross dichroic prism 34 are optically coupled.

In a case where the brightness of the projection type liquid crystal display apparatus is raised, each aperture mask 125 (see FIG. 9) absorbs scattered light emitted from each scattering type liquid crystal plate 122 if a black (dark) image is continued for a long time, causing the temperature of the abovedescribed three reflecting and scattering type liquid crystal devices 35R, 35B and 35G to be raised. If the temperature is raised excessively, the operation of the scattering type liquid crystal plate 122 becomes unstable or stopped.

Accordingly, the projection type liquid crystal display apparatus according to this embodiment is arranged in such a manner that the aqueous solution of ethylene glycol 42 is enclosed between the three reflecting and scattering type liquid crystal devices 35R, 35B and 35G and the cross dichroic prism 34. As a result, the three reflecting and scattering type liquid crystal devices 35R, 35B and 35G are cooled to prevent the temperature rise for the purpose of stabling the operation of the scattering type liquid crystal plate 122 and raising the brightness.

Furthermore, since the aqueous solution of ethylene glycol 42 the refraction factor of which is about 1.5 is used, reflection of light taken place between the abovedescribed three reflecting and scattering type liquid crystal devices 35R, 35B and 35G and the cross dichroic prism 34 can be prevented. Therefore, the deterioration in the image quality can be prevented.

Although the aqueous solution of ethylene glycol 42 is employed to optically couple the three reflecting and scattering type liquid crystal devices 35R, 35B and 35G and the cross dichroic prism 34, silicone oil the refraction factor of which is about 1.5 may be used.

Figure 11:
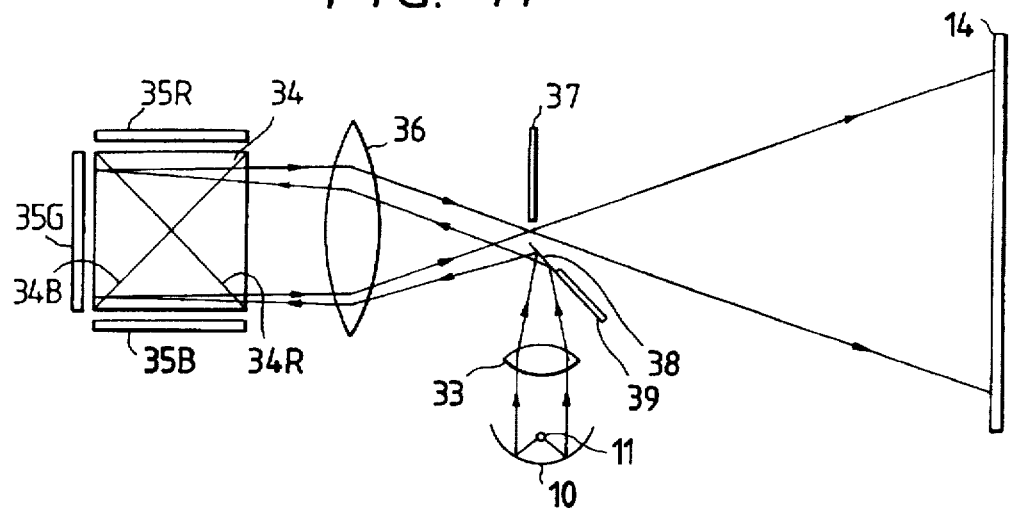
FIG. 11 is a schematic structural view which illustrates a sixth embodiment of the projection type liquid crystal display apparatus according to the present invention.

FIG. 11 is a schematic structural view which illustrates a sixth embodiment of the projection type liquid crystal display apparatus according to the present invention.

The projection type liquid crystal display apparatus according to this embodiment is different from the projection type liquid crystal display apparatus shown in FIG. 7 in that the synthetic image light beam emitted from the convergent lens 36 does not pass through the projection lens when it is projected onto the screen 14.

Therefore, since the number of the lens elements in the optical system can be reduced in the projection type liquid crystal display apparatus according to this embodiment, the overall size of the apparatus can be reduced in comparison to that shown in FIG. 7.

The projection type liquid crystal display apparatus shown in FIG. 11 is structured into a known front projection type apparatus in which the liquid crystal device is disposed adjacent to the user. In a case where a known backside projection type structure in which the liquid crystal device is included in the body of the apparatus is employed, an advantage can be obtained in that the cost can be reduced.

Figure 12:
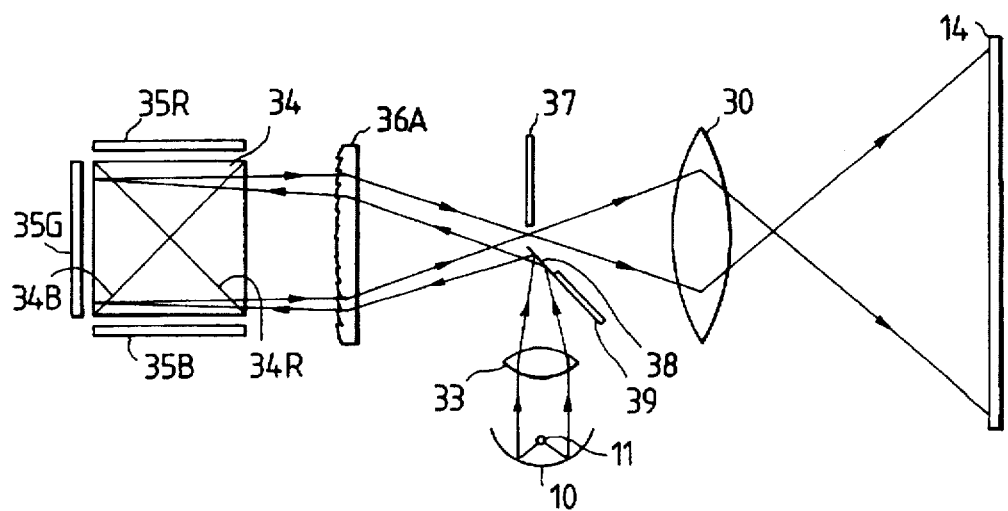
FIG. 12 is a schematic structural view which illustrates a seventh embodiment of the projection type liquid crystal display apparatus according to the present invention.

FIG. 12 is a schematic structural view which illustrates a seventh embodiment of the projection type liquid crystal display apparatus according to the present invention.

The projection type liquid crystal display apparatus according to this embodiment is different from the projection type liquid crystal display apparatus shown in FIG. 7 in that a fresnel lens 36A is used in place of the convergent lens 36 to convert the white light beam emitted from the light source portion and reflected by the reflecting mirror 38 into a substantially parallel light beam before it is made incident upon the cross dichroic prism 34. Furthermore, the synthetic image light beam emitted from the cross dichroic prism 34 is converged at an aperture portion formed by an end portion of the first shielding mask 37 and an end portion of the reflecting mirror 38.

Since the fresnel lens 36A can be disposed to correspond to a position which substantially comes in contact with the cross dichroic prism 34 in the projection type liquid crystal display apparatus as compared with the use of ordinary convex lens as convergent lens 36, the overall size of the apparatus can be reduced.

Figure 13:
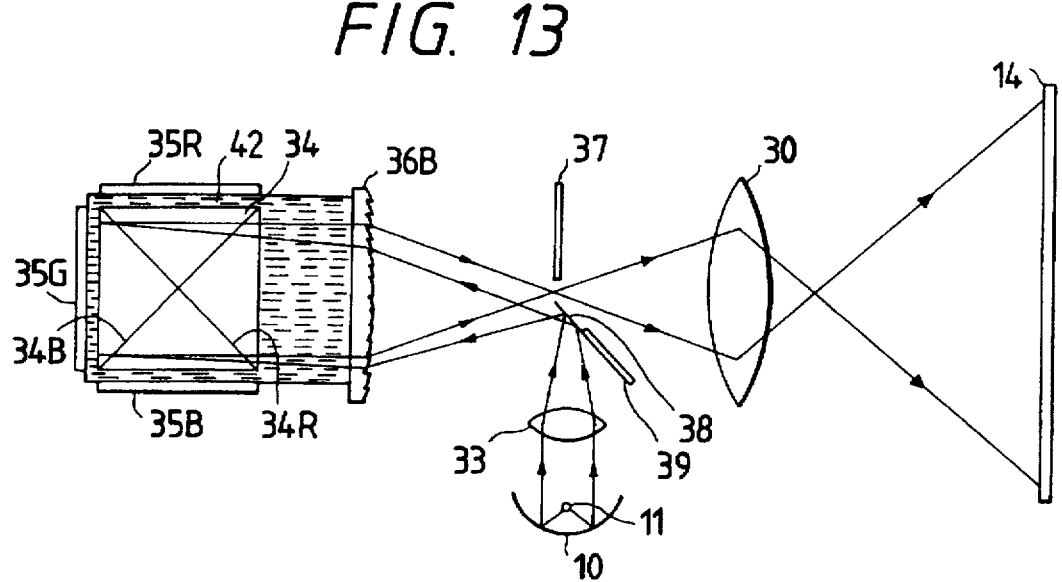
FIG. 13 is a schematic structural view which illustrates an eighth embodiment of the projection type liquid crystal display apparatus according to the present invention.

FIG. 13 is a schematic structural view which illustrates an eighth embodiment of the projection type liquid crystal display apparatus according to the present invention.

The projection type liquid crystal display apparatus according to this embodiment is different from the projection type liquid crystal display apparatus shown in FIG. 12 in the following structures:

(A) The aqueous solution of ethylene glycol 42 the refraction factor of which is about 1.5 is enclosed between the three reflecting and scattering type liquid crystal devices 35R, 35B and 35G and the cross dichroic prism 34 so that each of the three reflecting and scattering type liquid crystal devices 35R, 35B and 35G and the cross dichroic prism 34 are optically coupled.

(B) The aqueous solution of ethylene glycol 42 the refraction factor of which is about 1.5 is also enclosed between the fresnel lens 36B and the cross dichroic prism 34 so that the fresnel lens 36B and the cross dichroic prism 34 are optically coupled.

(C) The fresnel lens 36B is disposed in such a manner that its lens confronts the screen 14.

According to the projection type liquid crystal display apparatus is, similarly to that shown in FIG. 10, the aqueous solution of ethylene glycol 34 is used to prevent the temperature rise of each of the scattering type liquid crystal plate 122 (see FIG. 9) of the abovedescribed three reflecting and scattering type liquid crystal devices 35R, 35B and 35G. Therefore, the brightness can be raised. Furthermore, in a case where the fresnel lens 36B is made of plastic in order to reduce the cost, the problem of the unstable light convergent operation of the fresnel lens 36B can be prevented, the unstable light convergent operation being due to the deformation of the plastic fresnel lens 36B by the heat of white light beam emitted from the light source portion and the heat of modulated white light beam emitted from the dichroic prism 34.

Furthermore, the white light beam emitted from the light source portion and reflected by the reflecting mirror 38 is, as shown in FIG. 13, made incident upon the fresnel lens 36B while making a predetermined angle from it. Therefore, it is preferable that the abovedescribed lens side of the fresnel lens 36B confronts the cross dichroic prism 34 (the flat side confronts the screen 14) in order to prevent the eclipse of the white light beam at the lens side of the fresnel lens 36B. However, no problem takes place even if the lens side is made confront the screen 14 according to this embodiment since the degree of the influence of the eclipse is small.

Also according to this embodiment, silicone oil the refraction factor of which is about 1.5 may be used in place of the aqueous solution of ethylene glycol 34.

Figure 14:
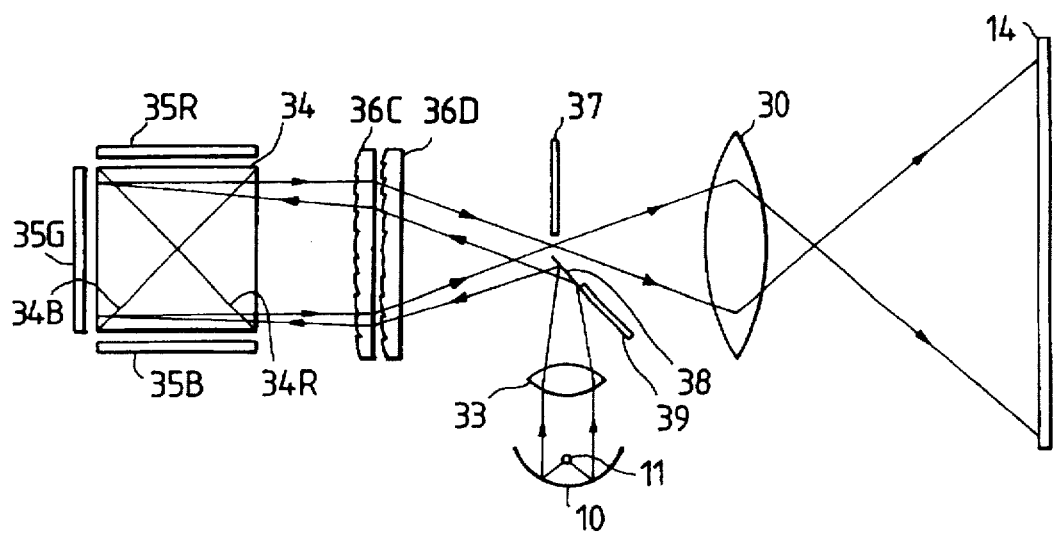
FIG. 14 is a schematic structural view which illustrates a ninth embodiment of the projection type liquid crystal display apparatus according to the present invention.

FIG. 14 is a schematic structural view which illustrates a ninth embodiment of the projection type liquid crystal display apparatus according to the present invention.

The projection type liquid crystal display apparatus according to this embodiment is different from that shown in FIG. 12 in that two fresnel lenses 36C and 36D are used to convert the white light beam emitted from the light source portion and reflected by the reflecting mirror 38 into a substantially parallel beam before it is made incident upon the cross dichroic prism 34. Furthermore, the modulated white light beam emitted from the cross dichroic prism 34 is converged at the aperture portion formed by an end portion of the first shielding mask 37 and an end portion of the reflecting mirror 38.

In the projection type liquid crystal apparatus according to this embodiment, the abovedescribed white light beam made incident from the reflecting mirror 38 while making a predetermined angle is converted into a substantially parallel beam by using the two fresnel lenses 36C and 36D. As a result, each of the lens side of fresnel lenses $126_1$ and $126_2$ can easily be designed.

Although each of the abovedescribed embodiments is arranged in such a manner that the lens array is constituted by arranging the refraction factor distributed type lenses on the glass plate, the present invention may be arranged in such a manner that the lens array is constituted by arranging lenses, each of which has an ordinary spherical surface, on the glass plate.

Figure 15:
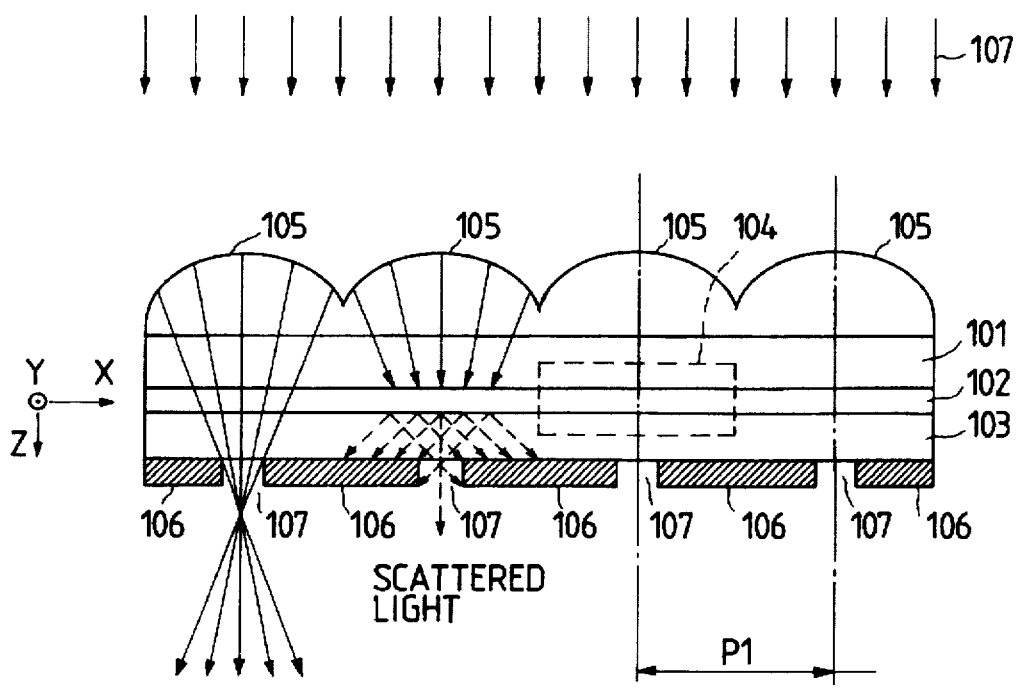
FIG. 15 is a cross sectional view which illustrates a third embodiment of the liquid crystal device according to the present invention.

FIG. 15 is a cross sectional view which illustrates an essential portion of the structure of another embodiment of the present invention, wherein an image display apparatus is illustrated which has a scattering type liquid crystal device which comprises a back plate consisting of a glass plate 101 and a liquid crystal layer 102 and a glass plate 103 serving as the face plate.

FIG. 15 illustrates a cross section obtainable when the scattering type liquid crystal display device is cut by a plane passing through the center of a pixel column and as well as perpendicular to Y-axis. The display pixels of the scattering type liquid crystal display device are arranged in direction X at a pitch of P1. A region 104 surrounded by a short dash line of FIG. 15 represents a size of one pixel of the liquid crystal panel. FIG. 15 illustrates the cross section for four pixels.

Each of convergent lenses 105 is a first optical means having a positive power, the convergent lenses 105 being disposed at the pitch P1, which is the same as the pitch for the pixels, in the direction X to correspond to each pixel of the scattering type liquid crystal display device.

A light shielding mask 106 is disposed on the light emission side of a glass plate 103, the light shielding mask 106 having apertures 107 which corresponds to the pixels at the pitch P1, which is the same as the pitch of the pixels. Thus, the emission side of the image display apparatus is constituted.

An illuminating light beam 107 is a substantially parallel beam emitted from a light source (omitted from illustration) to illuminate the scattering type liquid crystal display device. The light source must be able to emit the parallel light beam in a visible region, for example, an illuminating light source constituted by combining a conventional lamp and a parabolic mirror.

According to this embodiment, illuminating light beam 107 is converged by the convergent lens 105. Illuminating light beam 107 passes through the liquid crystal layer 102 as designated by a continuous line shown in FIG. 1 in a case where the liquid crystal layer 102 of the scattering type liquid crystal display device is in a transmissive state and the same is then emitted outwards in a scattered state after it has passed through the aperture 107 of the light shielding mask 106. In a case where the liquid crystal layer 102 of the scattering type liquid crystal display device is in the light scattered state, it is scattered by the liquid crystal layer 102 as designated by a dashed line of FIG. 15. Since the major portion of scattered light is absorbed by the light shielding mask 106, the portion emitted outwards can significantly be reduced. The liquid crystal of the liquid crystal layer 102 comprises the abovedescribed scattering type liquid crystal. Furthermore, the glass plates 101, 103, the liquid crystal layer 102 and an electrode pattern (omitted from illustration) and the like constitute the liquid crystal plate.

Since the structure according to this embodiment is arranged in such a manner that the scattering type liquid crystal display device is employed, the light utilization rate can significantly be improved. Furthermore, the image light beam emitted outside through each aperture 107 is scattered by the action of the convergent lens 105. Therefore, a very bright image can be displayed over a wide visual field angle. In addition, unnecessary scattered light is absorbed by the light shielding mask 106 so that an adverse effect upon the adjacent pixels can be prevented or eliminated. Therefore, image bleeding can be prevented and the contract can significantly be improved. Therefore, a displayed image exhibiting significantly improved quality can be formed in comparison to that obtainable from the conventional structure.

Then, another embodiment of the present invention will now be described with reference to FIG. 16.

The structure according to the embodiment shown in FIG. 15 is arranged in such a manner that the light shielding mask 106 is directly formed on the glass plate 103, which constitutes the face plate, for the purpose of simplifying the structure. However, the structure according to this embodiment is arranged in such a manner that the light shielding mask 106 is formed on a glass plate 201 which is individually disposed from the glass plate 103. The other structures are the same as the embodiment shown in FIG. 15 so that the same reference numerals are given to the same elements and their descriptions are omitted here.

Figure 16:
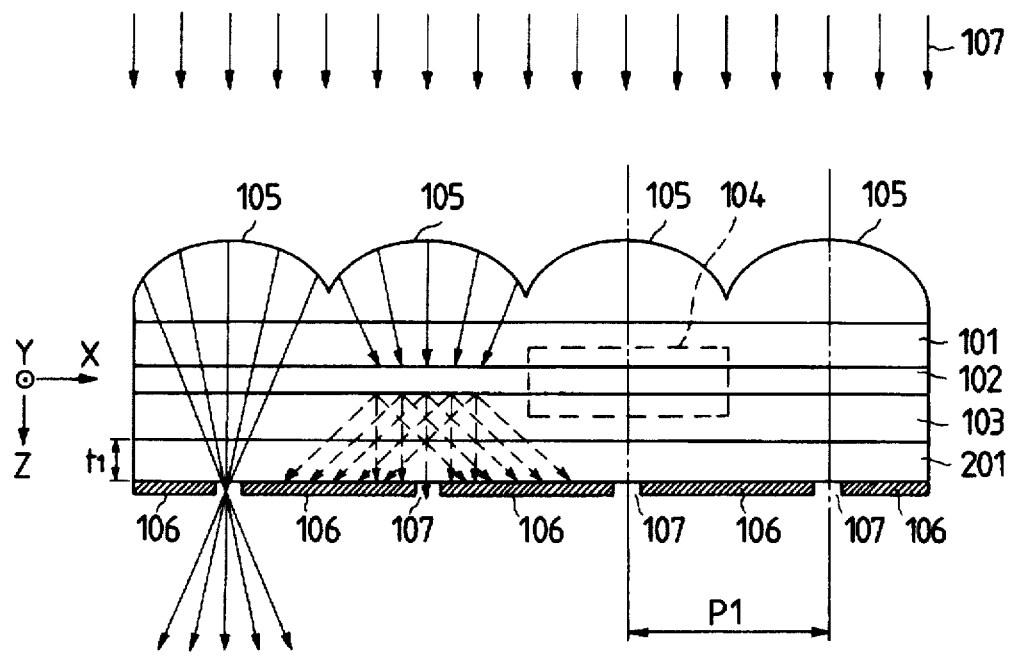
FIG. 16 is a cross sectional view which illustrates an essential portion of the structure of a fourth embodiment of the liquid crystal device according to the present invention.

FIG. 16 illustrates a case where thickness t1 of the glass plate 201 is made to be a proper thickness to make the aperture 107 formed in the light shielding mask 106 to be placed adjacent to the focal point of the convergent lens 105.

According to this embodiment, the transmissive light beam which has passed through the liquid crystal layer 102 is focused adjacent to the aperture 107. Therefore, the quantity of transmissive light emitted outwards can be maintained even if the size of the aperture 107 is reduced.

On the other hand, the quantity of the leakage of scattered light designated by the dashed line through the light shielding mask 106 can be reduced by reducing the size of the aperture 107. Therefore, bleeding can be prevented and the contrast can further be raised in comparison to the embodiment shown in FIG. 15.

Then, another embodiment of the present invention will now be described with reference to FIG. 17.

This embodiment is arranged in such a manner that the convergent lenses, which is the second optical means, are disposed not only on the illuminating light source side of the scattered type liquid crystal display device but also on the display side (the mask side) of the same at the same pitch as that of the pixels of the scattered type liquid crystal display device.

A glass plate 310 is disposed adjacent to the face plate 103 of the scattering type liquid crystal display device. On the other hand, a light shielding mask 306 and a convergent lens 311 are disposed on the light emission side of the abovedescribed plate 310. Since the other structures are the same as those according to the embodiment shown in FIG. 15. Therefore, the same reference numerals are given to the same elements and their descriptions are omitted here.

An illuminating light beam 108, which has passed through the liquid crystal layer 102 in a transmissive state, is further scattered by the action of the convergent lens 105 and a convergent lens 511 before it is emitted outwards. Therefore, a further wide visual field angle can be realized.

The reason for disposing the light shielding mask 306 and the convergent lens 311 on the surface of the glass plate 310 lies in that the yield can be improved by arranging them to be disposed individually. As an alternative to this, the light shielding mask 306 and the convergent lens 311 may be disposed on the glass plate 103 which constitutes the face plate of the scattering type liquid crystal display device.

Another embodiment of the present invention will now be described with reference to FIG. 18.

Figure 17:
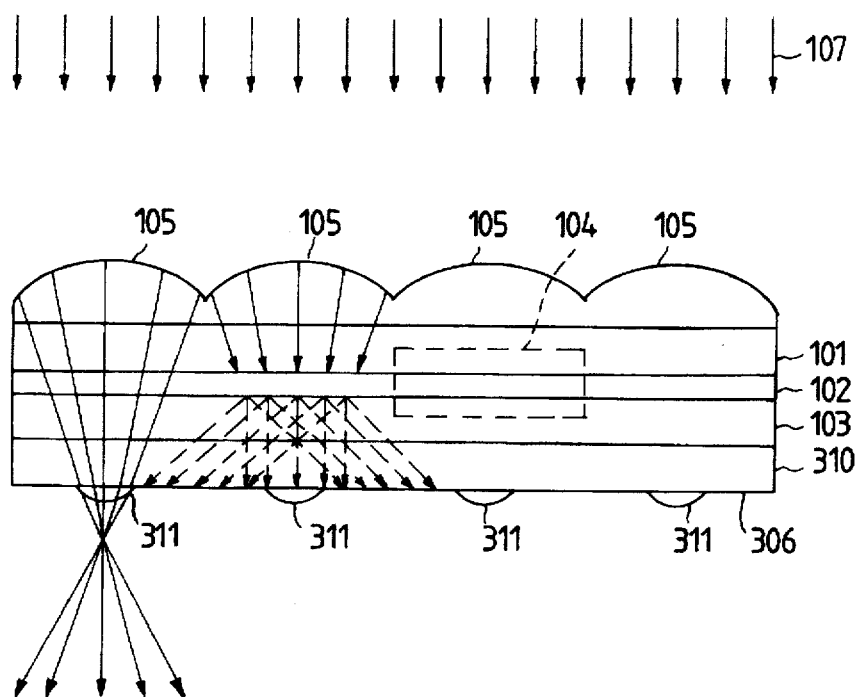
FIG. 17 is a cross sectional view which illustrates an essential portion of the structure of a fifth embodiment of the liquid crystal device according to the present invention.

The embodiment shown in FIG. 17 is arranged in such a manner that the light shielding mask and the convergent lens are disposed on the same plane. However, this embodiment is arranged in such a manner that a light shielding mask 406 is disposed on the focal plane apertured by the convergent lens 105 and a convergent lens 411 which is the second optical means, the light shielding mask 406 having apertures 407 formed at the same pitch as the pixels of the scattering type liquid crystal display device.

According to this embodiment, the loss of the display light beam can be prevented even if the diameter of the aperture 407 formed in the light shielding mask 406 is considerably reduced. Therefore, scattered light can easily be shielded and thereby a wide visual field angle and high contrast can be realized.

Each convergent lens 411 is disposed to correspond to the position of the aperture 407 of the light shielding mask 406. Furthermore, the diameter of it is properly determined in accordance with the power of the convergent lens 105 disposed adjacent to the illuminating light source. That is, in a case where the liquid crystal layer 102 is in a light transmissive state, the illuminating light beam 108 travels as designated by a continuous line of FIG. 18. The diameter of the convergent lens 411 is minimized in a range which will not shield the illuminating light beam apertured by the convergent lens 105.

In comparison between this embodiment and the system in which only the convergent lens 105 adjacent to the illuminating light source is used, the emitted light beams can be further converged by the action of the convergent lens 411. Therefore, an effect can be obtained in that the visual field angle can be enlarged.

The light shielding mask 406 according to this embodiment may comprise a light shielding mask formed by a black pattern is formed on a thin glass plate by printing or photolithography etching. As an alternative to this, a light shielding mask may be formed by forming the apertures 407 in a thin metal plate by photolithography etching before it is painted black.

Figure 18:
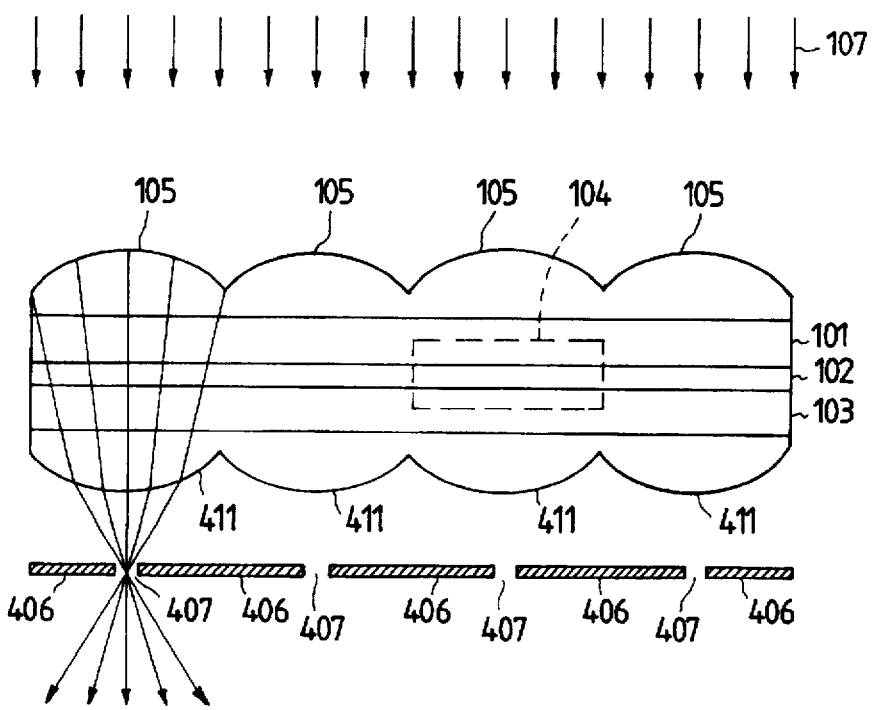
FIG. 18 is a cross sectional view which illustrates an essential portion of the structure of a sixth embodiment of the liquid crystal device according to the present invention.

The abovedescribed third and fourth embodiments shown in FIGS. 17 and 18 are arranged in such a manner that the convergent lens is disposed adjacent to the illuminating light source in comparison to the position of the liquid crystal panel, the convergent lens and the light shielding mask are disposed adjacent to the display side in comparison to the position of the liquid crystal panel and the abovedescribed elements are disposed at the same pitch of the pixels of the liquid crystal panel.

Then, another embodiment of the present invention will now be described with reference to FIG. 19.

Figure 19:
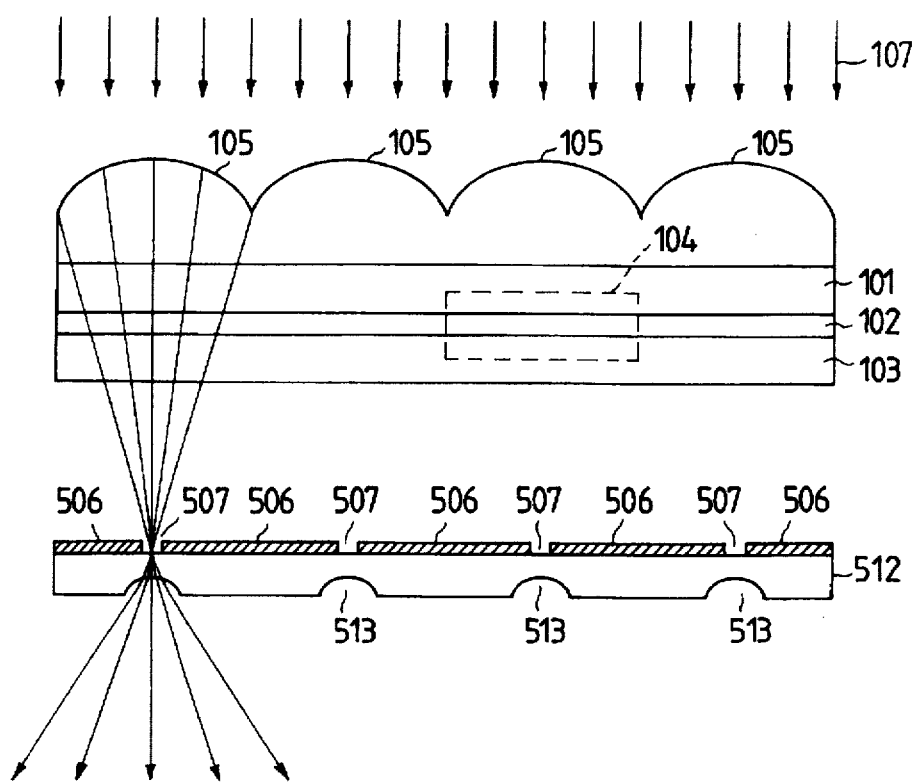
FIG. 19 is a cross sectional view which illustrates an essential portion of the structure of a seventh embodiment of the liquid crystal device according to the present invention.

FIG. 19 illustrates an example arranged in such a manner that lenses having negative power (hereinafter called "concave lenses") are disposed on the display side as the second optical means at the same pitch as that of the pixels of the scattering type liquid crystal display device. On the surface of a glass plate 512 adjacent to the scattering type liquid crystal display device, a light shielding mask 506 and apertures 507 are formed. The apertures 507 are formed at the position of the focal point at which the illuminating light beam 108 is converged by the convergent lens 106. On the display side of the glass plate 512, a concave lens 513 is disposed. Since the other structures are the same as those according to the embodiment shown in FIG. 16, the same reference numerals are given to the same elements and their descriptions are omitted here.

As shown in FIG. 19, the concave lens 513 is able to cause light beams to be emitted at a larger emission angle. By using the abovedescribed concave lens 513, a larger visual field angle can be realized.

Then, a specific example of the overall structure of the image display apparatus will now be described.

Figure 20:
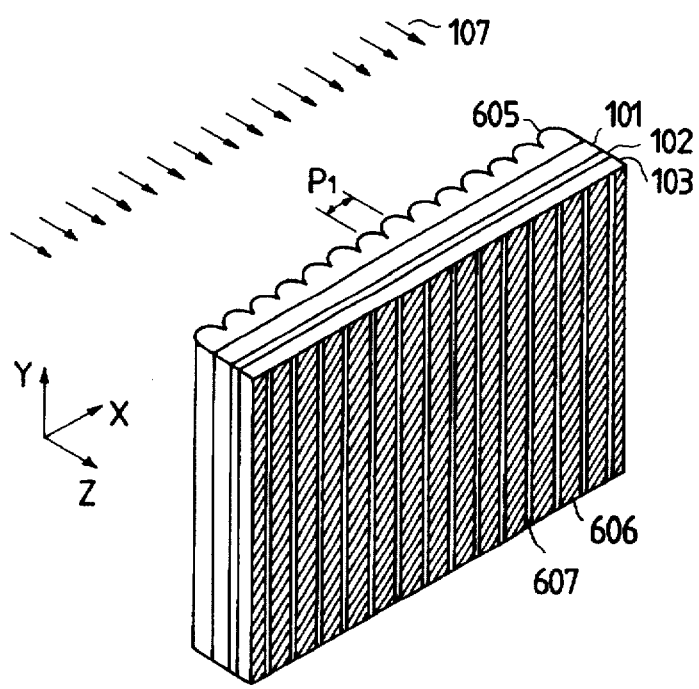
FIG. 20 is a perspective view which illustrates the specific structure of the liquid crystal device according to the present invention.

FIG. 20 illustrates a structure arranged in such a manner that the convergent lenses and apertures 607 are disposed at a pitch (P1) which is the same as the pitch of only the pixel columns in direction X of the pixel columns of the scattering type liquid crystal display device disposed in XY-plane. As shown in FIG. 20, the convergent lens is arranged in such a manner that cylindrical lenses 605 capable of converging light in direction Z are disposed at the pitch P1. On the other hand, the light shielding mask 606 are formed into a stripe shape running parallel to the Y-axis. Furthermore, the apertures 607 are constituted in such a manner that slits running parallel to the Y-axis are arranged at the pitch P1.

Figure 21:
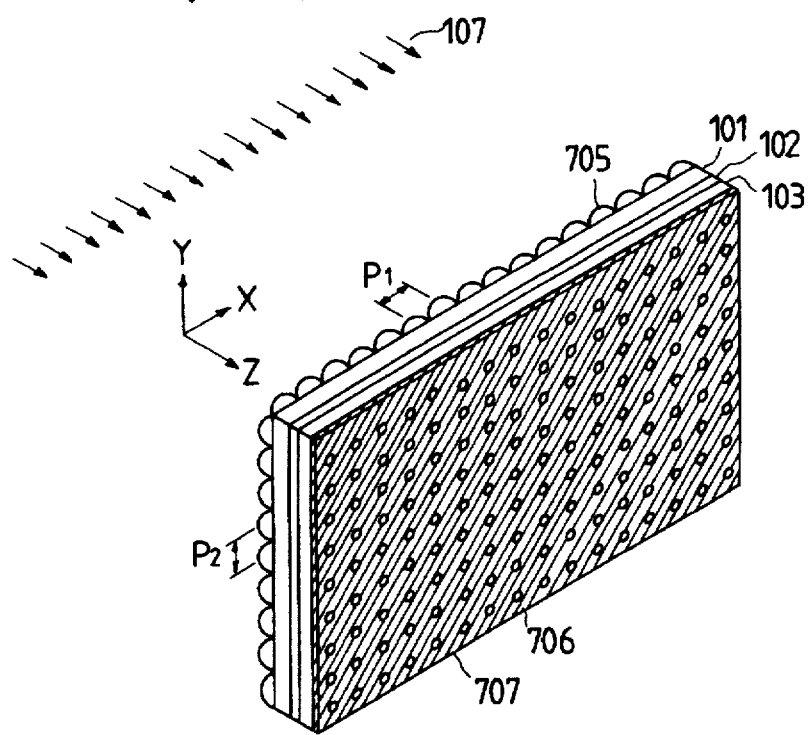
FIG. 21 is a perspective view which illustrates the other specific structure of the liquid crystal device according to the present invention.

FIG. 21 illustrates a structure arranged in such a manner that the pixels of the scattering type liquid crystal display device correspond to the convergent lenses and the apertures of the light shielding mask in both the directions X and Y. The pixels of the scattering type liquid crystal display device composed by the glass plates 101, 103 and the liquid crystal layer 102 are arranged at the pitch P1 in the direction X and at pitch P2 in the direction Y. The convergent lenses comprise fly-eye lens 705 having lenses which are arranged at the pitch P1 in 5 the direction P1 and at P2 in the direction Y similarly to the pitch of the scattering type liquid crystal display devices. Also apertures 707 formed in the light shielding mask 706 are arranged at the pitch P1 in the direction X and at the pitch P2 in the direction Y.

Then, a structure will now be described in which the convergent lenses and the light shielding mask are individually disposed.

Figure 22:
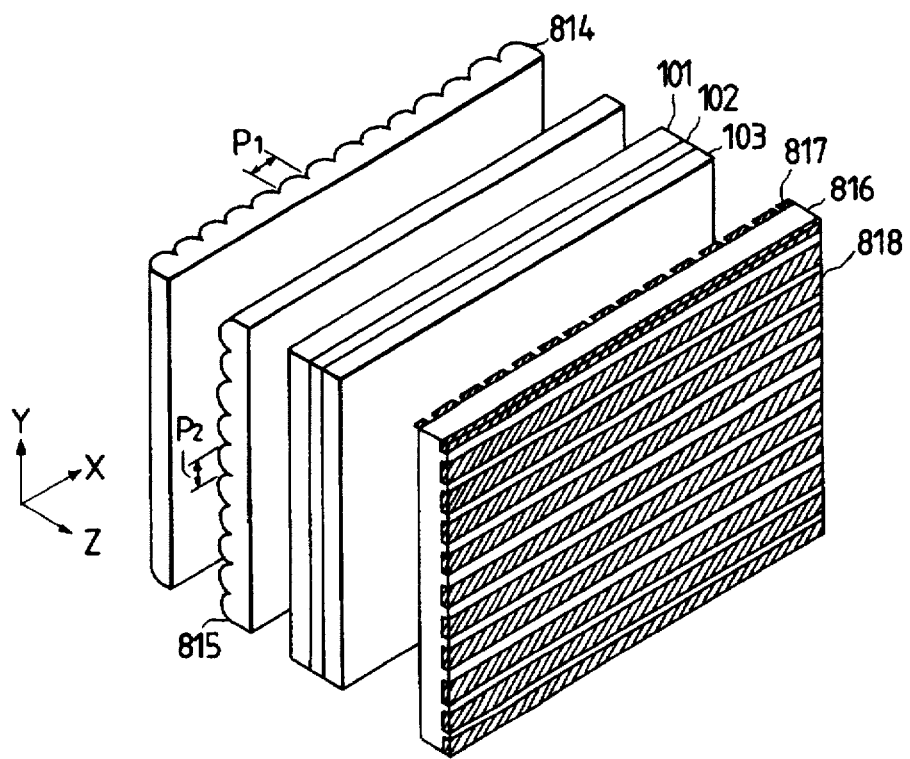
FIG. 22 is a perspective view which illustrates the other specific structure of the liquid crystal device according to the present invention.
Figure 23A:
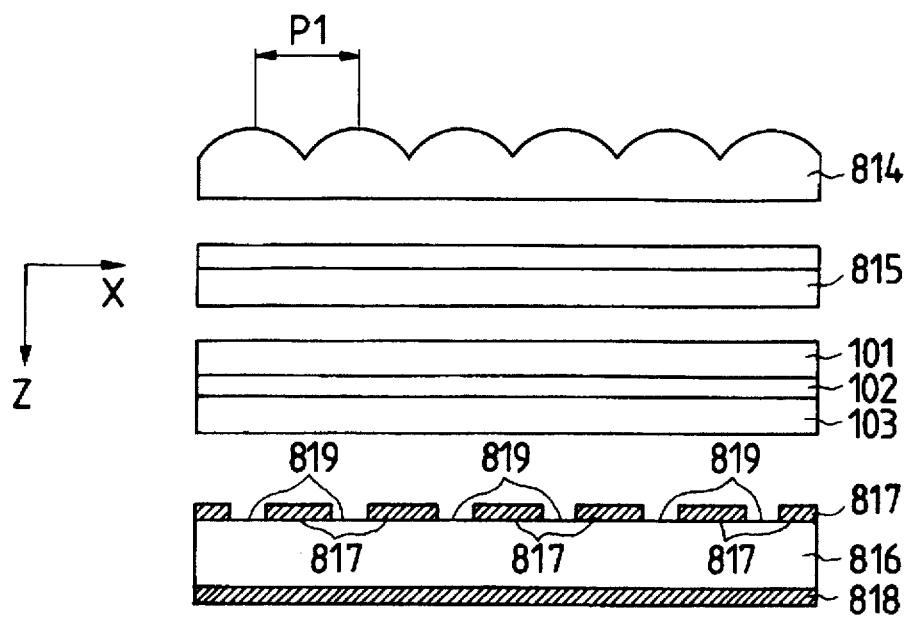
FIGS. 23A and 23B respectively are a cross sectional view taken along an XZ-plane of the device shown in FIG. 22 and that taken along a YZ-plane of the same.
Figure 23B:
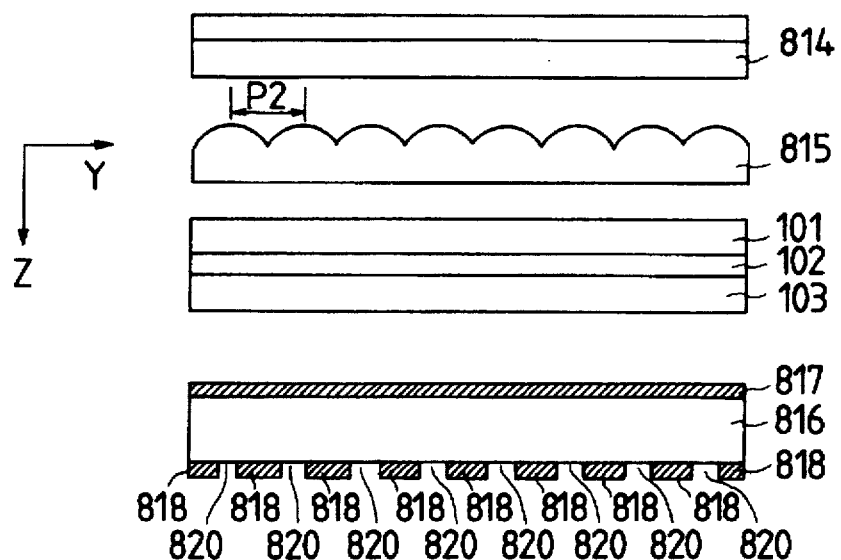

FIGS. 22, 23A and 23B are cross sectional views which respectively illustrate an example of the abovedescribed structure. FIG. 23A is cross sectional view taken along plane XZ of the perspective drawings shown in FIG. 22. FIG. 23B is a cross sectional view taken along plane YZ of the same.

According to this embodiment, it is assumed that the main scanning direction is direction X and the sub-scanning direction is direction Y. In the main scanning direction, pixels of the scattering type liquid crystal device are arranged at the pitch P1, while the same are arranged at the pitch P2 in the sub-scanning direction.

Referring to the drawing, cylindrical lenses 814 have a bus line running parallel to the Y-axis and the same are arranged in the direction X at the pitch P1. Cylindrical lenses 815 have a bus line running parallel to the X-axis and the same are arranged at the pitch P2 in the direction Y.

A glass plate 816 is disposed on the light emission side of the scattering type liquid crystal display device. On the surface of the glass plate 816 adjacent to the scattering type liquid crystal display device, a light shielding mask 817 is disposed. On the other hand, a light shielding mask 818 is disposed on the light emitting side of the same. The light shielding mask 817 is formed into a stripe pattern running parallel to the Y-axis, the light shielding mask 817 having slit-like apertures 819 formed at the pitch P1 as shown in FIG. 23A. On the other hand, the light shielding mask 818 is formed into a stripe pattern running parallel to the X-axis, the light shielding mask 818 having stripe-like apertures 820 formed at the pitch P2 as shown in FIG. 23B.

According to this embodiment, the light shielding mask 817 and the apertures 819 are, similarly to the structure shown in FIG. 17, arranged with respect to the position of the convergent lenses 814 in such a manner that the apertures 819 are formed at the position of the focal point of the illuminating light beam, which has passed through the liquid crystal panel, by the action of the convergent lenses 814. Similarly, the apertures 820 of the light shielding mask 818 are formed at the position of the focal point of the illuminating light made by the convergent lens 815 which has passed through the liquid crystal panel.

According to this embodiment, the convergent means and the light shielding means (and apertures) are independently disposed in the direction X and the direction Y at the same pitch as the pixels arranged in the scattering type liquid crystal display device. As a result, a very wide visual field angle can be realized in four directions. Although the structure according to this embodiment is arranged in such a manner that the convergent lens is disposed more adjacent to the illuminating light source than the scattering type liquid crystal display device, another structure may be employed in which the convergent lens is also disposed on the display side of the scattering type liquid crystal display device as shown in FIGS. 17 and 18. As an alternative to this, a structure may be employed in which a concave lens is disposed on the display side as shown in FIG. 19.

The present invention is not limited to the lens shown in FIGS. 15 to 23. For example, a flat optical element of a distributed refraction factor type may, of course, be employed.

The present invention can preferably be applied to any of known scattering type liquid crystal display devices capable of controlling scattering and transmission of light for each pixel exemplified in the description of the related background art. Furthermore, the simple matrix system and the active matrix system have been known as the method of driving the liquid crystal medium. However, the present invention is not limited to this if the method is able to constitute the liquid crystal panel.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. A liquid crystal device for controlling scattering of light beams made incident upon a plurality of portions of a liquid crystal layer thereof, said liquid crystal device comprising:

a first lens array having lenses disposed to correspond to said portions of said liquid crystal layer, said lenses causing said light beams transmitted from said corresponding portions of said liquid crystal layer to travel toward a focal plane;

a mask for shielding scattered light transmitted from said first lens array and as well as allowing non-scattered light to pass through, said mask having a plurality of aperture portions which are formed along said focal plane to correspond to said lenses of said first lens array so as to allow non-scattered light transmitted from corresponding lenses to pass through; and a second lens array having lenses arranged to correspond to said aperture portions of said mask, said lenses substantially collimating said non-scattered light transmitted from corresponding aperture portions of said mask;

wherein said light beams are caused to travel toward said liquid crystal layer via said mask and said first lens array and wherein said liquid crystal device further comprises a reflecting surface for reflecting and returning said light beam, which has passed through said liquid crystal layer, to said liquid crystal layer.

2. A liquid crystal device for controlling scattering of light beams made incident upon a plurality of portions of a scattering type liquid crystal layer thereof, said liquid crystal device comprising:

a lens array having lenses disposed to correspond to said portions of said liquid crystal layer, said lenses converging said light beam to said corresponding portions of said liquid crystal layer;

a mask for shielding scattered light transmitted from said liquid crystal layer and as well as allowing non-scattered light to pass through, said mask having a plurality of aperture portions formed to correspond to said portions of said liquid crystal layer so as to allow said non-scattered light transmitted from said corresponding portions to pass through, wherein said lens array converges said light beams onto the side of said liquid crystal layer adjacent to said mask, wherein said lens array acts to focus said light beam to a focal plane of said lens array, wherein said mask is disposed on said focal plane, and wherein said mask is formed on a first surface of a transparent plate adjacent to said liquid crystal layer and a second surface of said transparent plate opposing said first surface has a concave lens array, said concave lens array of said transparent plate having lenses disposed to correspond to said aperture portions of said mask so as to diverge said non-scattered light transmitted from said corresponding aperture portion.

3. A liquid crystal device for controlling scattering of light beams made incident upon a plurality of portions of a scattering type liquid crystal layer thereof, said liquid crystal device comprising:

a lens array having lenses disposed to correspond to said portions of said liquid crystal layer, said lenses converging said light beam to said corresponding portions of said liquid crystal layer;

a mask for shielding scattered light transmitted from said liquid crystal layer land as well as allowing non-scattered light to pass through, said mask having a plurality of aperture portions formed to correspond to said portions of said liquid crystal layer so as to allow said non-scattered light transmitted from said corresponding portions to pass through, wherein said lens array converges said light beams onto the side of said liquid crystal layer adjacent to said mask, wherein said lens array acts to focus said light beam to a focal plane of said lens array, wherein said mask is disposed on a plane deviated from said focal plane toward said liquid crystal layer.

4. A liquid crystal device according to claim 3, wherein each of said aperture portions of said mask has a convex lens element for converging said non-scattered light.

5. A liquid crystal device for controlling scattering of light beams made incident upon a plurality of portions of a scattering type liquid crystal layer thereof, said liquid crystal device comprising:

a lens array having lenses disposed to correspond to said portions of said liquid crystal layer, said lenses converging said light beam to said corresponding portions of said liquid crystal layer;

a mask for shielding scattered light transmitted from said liquid crystal layer and as well as allowing non-scattered light to pass through, said mask having a plurality of aperture portions formed to correspond to said portions of said liquid crystal layer so as to allow said non-scattered light transmitted from said corresponding portions to pass through wherein said lens array converges said light beams onto the side of said liquid crystal layer adjacent to said mask, and wherein a convex lens array is disposed between said liquid crystal layer and said mask, said convex lens array having lenses which are disposed to correspond to said portions of said liquid crystal layer to converge said non-scattered light transmitted from said corresponding portions onto said aperture portions in said mask.

6. A projector for projecting an image formed by an illuminated liquid crystal light valve to a projection optical system, said projector comprising improvements;

said light valve controls scattering of light made incident upon each of a plurality of portions of a scattering type liquid crystal layer so that said image is formed;

a first lens array is provided which has lenses disposed to correspond to said portions of said liquid crystal layer, each of said lenses causing said light beam transmitted from said corresponding portions of said liquid crystal layer to travel toward a focal plane;

a mask is provided which shields scattered light transmitted from said first lens array and allows non-scattered light to pass through, said mask having a plurality of apertures which are disposed along said focal plane to correspond to said lenses of said first lens array so as to allow said non-scattered light transmitted from said corresponding lenses to pass through; and a second lens array is provided which has lenses which are disposed to correspond to said apertures of said mask, each of said lenses substantially collimating said non-scattered light transmitted from said corresponding apertures of said mask so as to cause it to travel toward said optical system, wherein said light valve comprises a reflecting type light which is illuminated by said light valve from said optical system side.

7. A projector according to claim 6, wherein said light valve is illuminated by light which has been substantially collimated.

8. A projector according to claim 6 wherein said light valve is cooled by a cooling means.

9. A projection type display apparatus comprising:

a liquid crystal display panel;

an illuminating means for illuminating said liquid crystal display panel; and a projecting optical system for projecting an image formed by said liquid crystal display panel by light from said liquid crystal display panel onto a screen wherein said liquid crystal display panel comprises:

a liquid crystal layer including scattering type liquid crystal;

a first lens array disposed at a light outgoing side of said liquid crystal layer said first lens array having lenses each of which corresponds to a pixel of said liquid crystal layer;

a mask disposed at a light outgoing side of said first lens array having a light-shielding area and an aperture array having aperture portions, each of which corresponds to a lens of said first lens array; and a second lens array disposed at a light outgoing side of said mask, said second lens array having lenses each of which corresponds to one of said aperture portions;

wherein each pixel of said liquid crystal layer makes a light beam incident on said each pixel scatter or transmit through said each pixel according to an input signal;

wherein each lens of said first lens array has a positive refracting power, makes said scattered light beams from each pixel converge onto a light-shielding area of said mask and makes said transmitted light beams from said each pixel converge onto each of said apertures of said mask; and wherein each lens of said second lens array has a positive refracting power and makes said transmitted light beam from said each pixel from each of said aperture portions of said mask direct to said projecting optical system.

10. An aperture according to claim 9, wherein said projecting optical system comprises a single projection lens system.

11. An apparatus according to claim 9, wherein each of the lenses of said first lens array is a refractive index distribution type lens.

12. An apparatus according to claim 9, wherein each of the lenses of said second lens array is a refractive index distribution type lens.

13. An apparatus according to claim 12, wherein each of the lenses of said first lens array is a refractive index distribution type lens.

14. An apparatus according to claim 9, wherein said illuminating means illuminates said display panel with a collimated light beam and said mask is disposed on a focal plane of a back side of said first lens array.

15. An apparatus according to claim 9, wherein said mask is disposed on a focal plane of a front side of said second lens array and said second lens array collimates said transmitted light beam from said each pixel from each of said aperture portions of said mask.

* * * * *

UNITED STATES PATENT AND TRADEMARK OFFICE
CERTIFICATE OF CORRECTION

PATENT NO. : 5,631,750
DATED : May 20, 1997
INVENTOR(S) : Minoura et al.

It is certified that error appears in the above-indentified patent and that said Letters Patent is hereby corrected as shown below:

In the claims:

Claim 3 line 10, delete "land" and insert -- and -- therefor.

Signed and Sealed this

Fifth Day of August, 1997

Attest:

BRUCE LEHMAN

Attesting Officer

Commissioner of Patents and Trademarks